(12) United States Patent
Chu et al.

(10) Patent No.: US 10,174,727 B2
(45) Date of Patent: Jan. 8, 2019

(54) INTAKE AIR CONTROL APPARATUS FOR VEHICLE

(71) Applicants: Hyundai Motor Company, Seoul (KR); Kia Motors Corporation, Seoul (KR)

(72) Inventors: Dong Ho Chu, Ansan-si (KR); Yang Geol Lee, Hwaseong-si (KR); Yong Hoon Kim, Seoul (KR); Sung Jun Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/622,461

(22) Filed: Jun. 14, 2017

(65) Prior Publication Data
US 2018/0135572 A1 May 17, 2018

(30) Foreign Application Priority Data
Nov. 11, 2016 (KR) .................. 10-2016-0149918

(51) Int. Cl.
*F01L 3/00* (2006.01)
*F02M 35/10* (2006.01)
(52) U.S. Cl.
CPC .............. *F02M 35/10255* (2013.01); *F02M 35/10262* (2013.01)
(58) Field of Classification Search
CPC ...... F02B 31/06; F02B 2275/48; F02B 17/00; F02F 1/4242; F02M 35/10262

USPC .................. 123/188.1, 184.56, 306
See application file for complete search history.

(56) References Cited

U.S. PATENT DOCUMENTS

| 4,308,829 | A | * | 1/1982 | Yamada | ................. F02B 31/06 |
| | | | | | 123/188.14 |
| 5,915,354 | A | * | 6/1999 | Ma | ......................... F02B 31/04 |
| | | | | | 123/306 |
| 6,478,008 | B2 | * | 11/2002 | Wolters | ................. F02F 1/4242 |
| | | | | | 123/306 |

(Continued)

FOREIGN PATENT DOCUMENTS

| JP | H08-296535 A | 11/1996 |
| JP | H 09256858 A | 9/1997 |

(Continued)

*Primary Examiner* — Marguerite McMahon
*Assistant Examiner* — James Kim
(74) *Attorney, Agent, or Firm* — Morgan, Lewis & Bockius LLP

(57) ABSTRACT

An intake air control apparatus for a vehicle may include a valve flap provided in an air intake passage, the valve flap having a rotation shaft facing opposite sides of the air intake passage, to control a cross-sectional area of air intake flow according to a rotation angle thereof about the rotation shaft; a driving device supplying a driving force to the valve flap; and a port plate being provided in the air intake passage, with a longitudinal direction thereof being in parallel to a longitudinal direction of the air intake passage, the port plate dividing the air intake passage into an upper passage and a lower passage, wherein based on a width direction, at least a portion of the port plate has a height changing portion that changes a height of the port plate from a lower internal wall of the air intake passage.

7 Claims, 3 Drawing Sheets

(56) References Cited

U.S. PATENT DOCUMENTS

| | | | | |
|---|---|---|---|---|
| 6,886,516 B2* | 5/2005 | Harui | ............... | F02B 31/04 123/184.52 |
| 7,156,071 B2* | 1/2007 | Abe | ............... | F02B 31/06 123/188.14 |
| 8,215,278 B2* | 7/2012 | Kummermehr | ......... | F02B 25/14 123/184.52 |
| 8,991,370 B2* | 3/2015 | Yamamoto | ....... | F02M 35/10281 123/306 |
| 2002/0020389 A1* | 2/2002 | Wolters | ............... | F02F 1/4242 123/306 |

FOREIGN PATENT DOCUMENTS

| | | |
|---|---|---|
| KR | 10-1997-0001923 A | 1/1997 |
| KR | 20-1998-037543 U | 9/1998 |
| KR | 10-2004-0086798 A | 10/2004 |
| KR | 10-1382312 B1 | 4/2014 |

\* cited by examiner

INTAKE AIR CONTROL APPARATUS FOR VEHICLE

CROSS-REFERENCE(S) TO RELATED APPLICATIONS

The present application claims priority to Korean Patent Application No. 10-2016-0149918, filed on Nov. 11, 2016, the entire contents of which is incorporated herein for all purposes by this reference.

BACKGROUND OF THE INVENTION

Field of the Invention

The present invention relates generally to an intake air control apparatus for a vehicle. More particularly, the present invention relates to an intake air control apparatus for a vehicle, the apparatus being provided in an intake air passage to control intake air flow flowing into a combustion chamber of an engine.

Description of Related Art

Recently, in a vehicle, and more particularly, in a vehicle engine, a variety of technologies relating to injection methods for fuel, control methods for air intake, and structures of an intake port have been developed and applied to improve engine efficiency, gas mileage, and so on.

Of the technologies mentioned above, there is a technology that improves engine efficiency, and particularly improves the performance of mixing the fuel flowing into the combustion chamber with the air intake wherein the mixture components have a uniform concentration, thereby increasing the combustion efficiency of the engine.

In particular, the technology, as a technology for improving the fuel-air mixing performance, may be configured wherein the shape of the intake port is modified, or may be configured wherein a baffle is disposed in the intake port to control the flow of the air intake and induce a tumble phenomenon and or a swirl of the air which flows into the combustion chamber.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an air intake control apparatus for a vehicle, the apparatus being configured for effectively inducing and controlling a tumble phenomenon and or a swirl of the intake air that flows toward a combustion chamber.

Various aspects of the present invention are directed to providing an air intake control apparatus for a vehicle, the apparatus including a valve flap disposed in an air intake passage, the valve flap having a rotation shaft facing opposite sides of the air intake passage, to control a cross-sectional area of the air flow according to a rotation angle thereof about the rotation shaft; a driving device supplying a driving force to the valve flap; and a port plate being disposed in the air intake passage with a longitudinal direction of the port plate being in parallel to a longitudinal direction of the air intake passage. The port plate divides the air intake passage into an upper passage and a lower passage, wherein based on a width direction, at least a portion of the port plate has a height changing portion that changes a height of the port plate from a lower internal wall of the intake air passage.

The valve flap may be configured for controlling intake air flow flowing into the lower passage by being rotated.

The port plate may be configured wherein the height changing portion is disposed at a center based on the width direction of the port plate, and the height changing portion has different heights at left and right portions thereof from the lower internal wall of the air intake passage.

The port plate may be configured wherein the height changing portion is disposed at a center of the port plate to form a step that changes the height of the port plate discontinuously.

The port plate may be configured wherein the height changing portion is disposed throughout the width direction of the port plate, wherein the height of the height changing portion changes throughout the width direction.

The port plate may be configured wherein the height thereof continuously changes along the width direction.

The port plate may be configured wherein the height thereof from the lower internal wall of the air intake passage changes continuously along the width direction.

The air intake control apparatus for a vehicle as described above is advantageous in that it is possible to effectively induce and control a tumble phenomenon and or a swirl of the air flowing toward the combustion chamber.

The air intake control apparatus for a vehicle as described above is advantageous since the port plate dividing the air intake passage into the upper passage and the lower passage is provided, and preferably the valve flap controlling the air flow in the lower passage is provided, it is possible to effectively induce a tumble phenomenon within the air intake.

The air intake control apparatus for a vehicle as described above is also advantageous since the port plate is disposed with the height changing portion, an imbalance in the flow area of the air intake or flow velocity is induced based on the width direction of the port plate, whereby it is possible to effectively induce swirl.

The air intake control apparatus for a vehicle as described above is further advantageous since the height changing portion may be disposed throughout the width direction of the port plate, the width direction of the port plate is formed to have an inclined shape, whereby it is possible to effectively induce swirl.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
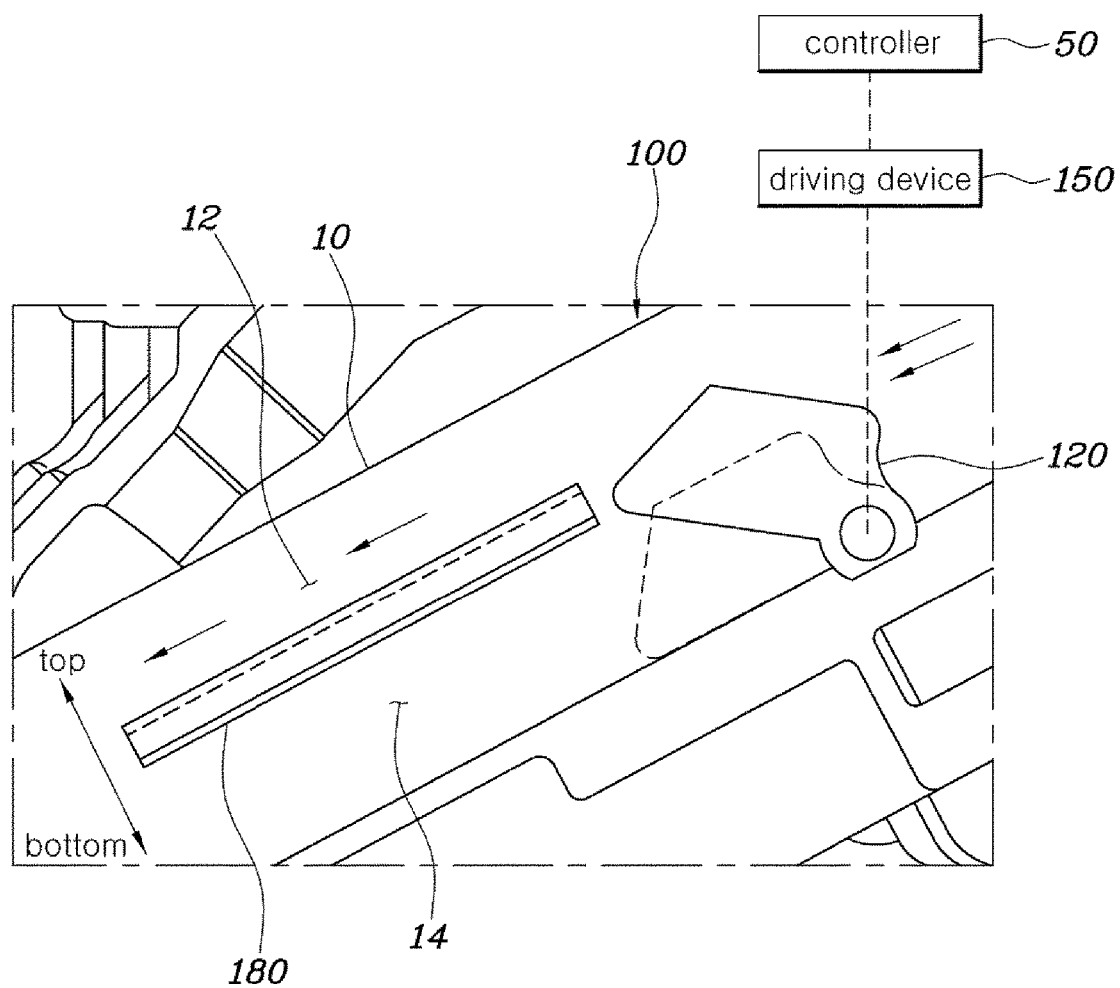
FIG. 1 is a view illustrating an air intake control apparatus for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Figure 2:
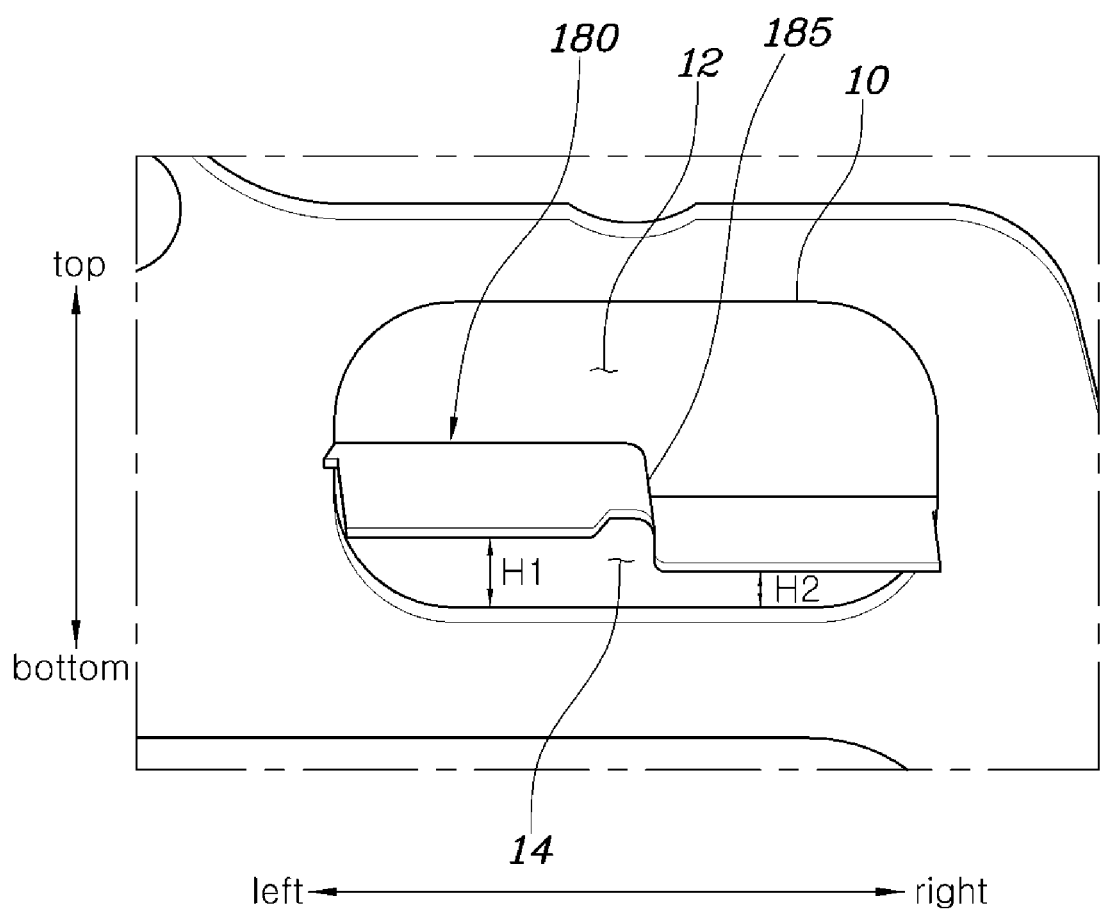
FIG. 2 is a sectional view illustrating a port plate of the air intake control apparatus for a vehicle according to another exemplary embodiment of the present invention.
Figure 3:
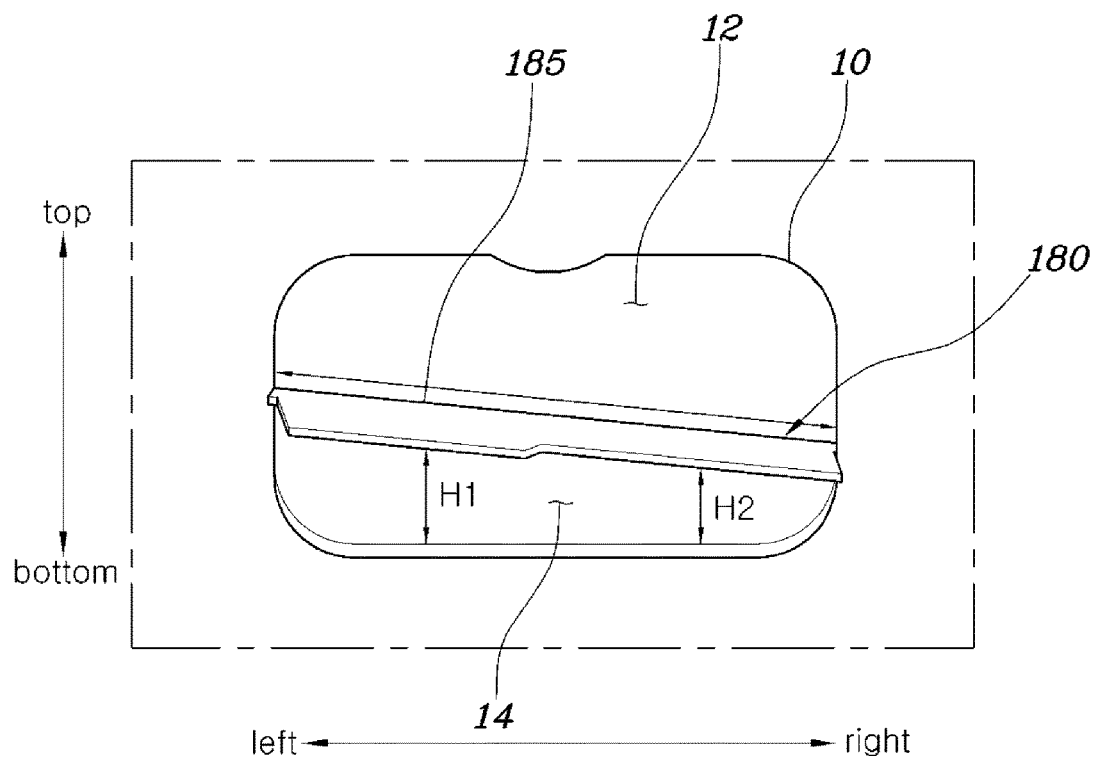
FIG. 3 is a sectional view illustrating a port plate of an air intake control apparatus for a vehicle according to a further exemplary embodiment of the present invention.

Reference will now be made in detail to the various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims, As shown in FIG. 1 to FIG. 3, an air intake control apparatus for a vehicle 100 according to an exemplary embodiment of the present invention includes a valve flap 120 deposed in an air intake passage 10, the valve flap having a rotation shaft facing opposite sides of the air intake passage 10 to control a cross-sectional area of air flow according to a rotation angle thereof about the rotation shaft; a driving device 150 supplying the driving force to the valve flap 120; and a port plate 180 disposed in the air intake passage 10, the longitudinal direction of the port plate being in parallel to a longitudinal direction of the air intake passage 10, the port plate dividing the air intake passage into an upper passage 12 and a lower passage 14, wherein based on a width direction at least a portion of the port plate has a height changing portion 185 which changes a height of the port plate from a lower internal wall of the air intake passage 10.

Hereinbelow, reference will be made in detail to the present invention.

The valve flap 120 is disposed in the intake air passage 10 and has the rotation shaft facing opposite sides of the intake air passage 10 to control the cross-sectional area of air flow according to the rotation angle thereof about the rotation shaft.

The valve flap 120 is disposed in the air intake passage 10, wherein an exemplary embodiment of the present invention the air intake passage 10 may refer to an intake port or an intake manifold disposed in an engine block. Preferably, since the present invention is configured for inducing a tumble phenomenon and or a swirl in a combustion chamber of an engine, in an exemplary embodiment of the present invention the air intake passage 10 may be a portion adjacent to the combustion chamber.

The valve flap 120 is disposed with the rotation shaft extending in a lateral direction of the air intake passage 10. The valve flap 120 rotates about the rotation shaft, wherein the cross-sectional area of the air intake passage 10 closed by the valve flap 120 is changed according to the rotation angle of the valve flap 120, whereby the valve flap 120 is configured to control the cross-sectional area of air flow.

The valve flap 120 may be configured in a variety of shapes. For example, the valve flap 120 may be in a planar shape wherein a degree of reducing the cross-sectional area of air flow is changed according to the rotation angle, wherein the valve flap 120 may be in a flat plate shape, or may be in a form of a plate having a curvature to be a portion of a cylinder. The specific shape of the valve flap 120 may be determined in consideration of a variety of factors including the shape of an internal wall of the air intake passage 10 and strategic aspects.

FIG. 1 illustrates the valve flap 120 that has a shape corresponding to the lower internal wall of the air intake passage 10, and has a structure configured for coming into close contact with the lower internal wall of the air intake passage 10 when necessary.

In an exemplary embodiment of the present invention, the top, bottom, left, and right may be determined based on the air intake passage 10. As described below, two passages divided by the port plate 180 are disposed in an upper direction and a lower direction based on the port plate 180, wherein it does not matter when the upper direction and the lower direction are changed with each other.

Further, left and right may be determined based on the width direction of the port plate 180, wherein in an exemplary embodiment of the present invention, it does not matter when left and right are changed with each other. However, in setting the top, bottom, left, and right in an exemplary embodiment of the present invention, a relative relation with the port plate 180 is set as described above.

In an exemplary embodiment of the present invention, as shown in FIG. 1 to FIG. 3, as one of various embodiments that is defined by the relation with the port plate 180, the top, bottom, left, and right are defined on a basis of the air intake passage 10, and a description will be made based thereon.

Meanwhile, the driving device 150 is configured for supplying the driving force to the valve flap 120.

The driving device 150 may be configured in a variety of manners including a negative pressure manner or a motorized manner. The driving device 150 is disposed on an external wall of the air intake passage 10, and the driving force is transmitted from the driving device 150 to the valve flap 120 through a connection member including a gear or a link. FIG. 1 schematically illustrates the driving device 150 disposed outside the air intake passage 10 for supplying the driving force to the valve flap 120.

Further, the controller 50 may be configured for controlling the operation of the driving device 150 in response to a combustion state of an engine or to a driving condition. The controller 50 is also configured for controlling the rotation angle of the valve flap 120 through the driving device 150.

For example, in the case of a low-velocity driving condition of a vehicle, the swirl and the level of the tumble phenomenon induction are required to be enhanced rather than a discharge coefficient (a flow rate of air), the controller 50 increases the rotation angle of the valve flap 120 to induce the swirl and the tumble phenomenon of intake air.

Further, in the case of a high-velocity driving condition of a vehicle, a discharge coefficient is required to be increased, the controller 50 decreases the rotation angle of the valve flap 120 to increase the flow rate of air.

The driving condition of a vehicle and the rotation angle of the valve flap 120 may be empirically or theoretically determined, and may be determined in a variety of manners in terms of control strategy by those skilled in the art.

Meanwhile, the port plate 180 is disposed in the air intake passage 10, with the longitudinal direction of the port plate being in parallel to the longitudinal direction of the air intake passage 10, and the port plate divides the air intake passage 10 into the upper passage 12 and the lower passage 14, wherein based on the width direction of the port plate, at least a portion of the port plate has the height changing portion 185 that changes a height of the port plate from a lower internal wall of the intake air passage 10.

To be more specific, the port plate 180 may be positioned to be continuous with the valve flap 120 in the air intake passage 10. Here, the port plate 180 may be disposed upstream or downstream of the valve flap 120, and in some cases, the location of the port plate 180 and the location of the valve flap 120 may be overlapped based on the longitudinal direction of the air intake passage 10 wherein the valve flap 120 is disposed at an upper portion or a lower portion of the port plate 180.

The port plate 180 is configured to maintain the cross-sectional area of air flow determined by the valve flap 120 by extending the same. Further, the downstream of the port plate 180 is disposed adjacent to the combustion chamber based on a flow direction of air intake wherein the cross-sectional area of air flow determined by the valve flap 120 is applied to the air flowing into the combustion chamber.

The cross-sectional area of air flow reduced by the valve flap 120 remains the same while facing downstream of the air intake passage 10 by the port plate 180, and in a state where the cross-sectional area of air flow is reduced, the air flowing into the combustion chamber flows biased upward or downward in an inlet of the combustion chamber.

As described above, when the air that flows into the combustion chamber, turbulence of the air flow occurs in the combustion chamber. The turbulence is advantageous for fuel-air mixing performance, whereby it is possible to realize complete combustion and improve combustion efficiency.

The port plate 180 may be in a planar shape having a width that extends in opposite directions (left and right directions) based on the air intake passage 10, and the valve flap 120 may be configured for blocking air flow of the lower passage 14 of the air intake passage 10 divided by the port plate 180.

In the present case, when the rotation angle of the valve flap 120 changes, the air intake flow of the lower passage 14 is blocked, and the air flows into the combustion chamber through the upper passage 12. Herein, a tumble phenomenon refers to a phenomenon where the air intake that is concentrated on the upper portion of the air intake passage 10 flows into the combustion chamber and swirls toward the lower portion of the air intake passage. The swirl is important as it improves the fuel-air mixing performance in a situation of low-velocity rotation of an engine.

Meanwhile, as described above, the port plate 180 of the present invention is disposed with the height changing portion 185 that changes a height of the port plate from a lower internal wall of the air intake passage 10. The height changing portion 185 is defined on a basis of the width direction of the port plate 180.

Further, unless otherwise noted, 'height' defined in an exemplary embodiment of the present invention refers to a height measured vertically from the lower internal wall of the air intake passage 10. Further, a height of the port plate 180 is determined to be uniform based on a longitudinal direction.

In other words, the height at the height changing portion 185 changes, but the rest of the port plate except the height changing portion 185 has a uniform height based on the width direction, wherein average heights of left and right portions based on the height changing portion 185 are different from each other.

FIG. 2 and FIG. 3 illustrate the port plate 180 formed with the height changing portion 185. As another exemplary embodiment of the present invention, in the port plate 180 shown in FIG. 2, the height changing portion 185 is disposed at a center of the port plate to form a step based on the width direction of the port plate 180. Accordingly, a left portion has a height of H1 different from a height of H2 of a right portion.

As a further exemplary embodiment of the present invention, FIG. 3 illustrates the height changing portion 185 disposed throughout the width direction of the port plate 180. In other words, the port plate 180 shown in FIG. 3 is configured wherein the height thereof from the lower internal wall of the air intake passage 10 changes throughout the width direction. Accordingly, a left portion has a height of H1 different from a height of H2 of a right portion.

In an exemplary embodiment of the present invention, the reason why the port plate 180 is disposed with the height changing portion 185 is for changing the flow characteristics of the air on a basis of the width direction of the port plate 180, which will be described in detail, hereinbelow.

As in an exemplary embodiment of the present invention, when the port plate 180 is disposed with the height changing portion 185, consequently, the air flowing through left and right sides of the air intake passage 10, based on the height changing portion 185, has different cross-sectional areas at left and right sides which leads to asymmetry of the air flow between the left and right sides.

As described above, the asymmetry of the air flow induces a swirl of air in the combustion chamber. The swirl, like the tumble phenomenon, is a vortex formed in air intake, but is different from the tumble phenomenon in terms of a rotation direction.

In an exemplary embodiment of the present invention, as described above, the tumble phenomenon refers to a phenomenon where the air intake creates turbulence to be swallowed from the upper portion of the combustion chamber toward the lower portion thereof, and the swirl refers to a phenomenon where the air swirls along a side wall of the combustion chamber.

In other words, based on the directions defined in an exemplary embodiment of the present invention, the tumble phenomenon rotates in a vertical direction thereof and the swirl phenomenon rotates in a lateral direction. As shown in FIG. 1 to FIG. 2, when the lower passage 14 of the air intake passage 10 is closed by the valve flap 120, the tumble phenomenon rotating upward to downward is induced; and when the left portion based on the height changing portion 185 is higher than the right thereof, the swirl phenomenon rotating from the left to the right is induced.

The manner of inducing swirl is not much different from that of the tumble. As described above, in an exemplary embodiment of the present invention, the valve flap 120 is configured to close the lower passage 14 defined by the port plate 180, wherein a flow velocity of the air in the upper passage 12 is faster than that in the lower passage 14, and in consideration of an area where the lower passage 14 and the upper passage 12 are combined right after via the port plate 180, air intake is concentrated on an upper portion of the area.

Here, in the upper portion of the area having a higher air density, the flow velocity is faster than that in the lower portion, and by the present velocity difference (or a pressure difference), the tumble phenomenon where the air flow in the upper portion is tumbled to the lower portion is induced.

Meanwhile, as in an exemplary embodiment of the present invention, in the case where the port plate 180 is disposed with the height changing portion 185, left and right portions of the port plate have different heights based on the height changing portion 185, or the height changing portion 185 itself has different heights at left and right portions thereof. In other words, the port plate 180 is configured wherein based on the width direction; a cross-sectional area of air flow of the left portion of the port plate from a predetermined point of the height changing portion 185 is different from that of the right portion.

In other words, the cross-sectional area of air flow formed by the port plate 180 is formed asymmetrically along the left and right directions, whereby asymmetric velocity is induced in the air intake flow, and swirl is induced by the velocity difference.

As shown in FIG. 2, when the left portion is higher than the right portion based on the height changing portion 185, the air of the left portion based on the height changing portion 185 has a faster flow velocity than the right portion.

Consequently, the air intake via the port plate 180 produces the swirl wherein the air flow of the left portion rotates toward the right portion.

Both the swirl and the tumble phenomenon improve the fuel-air mixing performance in the combustion chamber and the combustion efficiency. To induce swirl, unlike tumble, an additional opening or closing device may be disposed to induce unbalance between the left and right flow velocities of the air intake; however, the present invention is configured wherein the swirl is induced by changing a shape of the port plate 180 without additional devices or tools.

FIG. 1 illustrates the air intake control apparatus for a vehicle 100 according to an exemplary embodiment of the present invention; and FIG. 2 illustrates the port plate 180 according to another exemplary embodiment of the present invention. FIG. 3 illustrates the port plate 180 according to a further exemplary embodiment of the present invention.

Meanwhile, as shown in FIG. 1, in the air intake control apparatus for a vehicle 100 according to the exemplary embodiment of the present invention, the valve flap 120 is configured for controlling the air intake flow in the lower passage 14 by being rotated.

To be more specific, according to the exemplary embodiment of the present invention, the valve flap 120 is configured for controlling the air intake flow in the lower passage 14 of the air intake passage 10 and the upper passage 12, whereby the tumble phenomenon rotating upward to downward is preferably induced.

As described above, the port plate 180 of the present invention is disposed adjacent to the combustion chamber wherein the air is flows into the combustion chamber immediately after passing via the port plate 180.

Further, the intake port directly communicating with the combustion chamber is disposed at an upper portion of the combustion chamber wherein air flows into the combustion chamber from an upward to downward direction. The present configuration is advantageous to induce the rotation of the tumble phenomenon from upward to downward directions.

For example, in a structure where the air flows from the upper portion to the lower portion of the combustion chamber, when the tumble phenomenon is induced to rotate flow downward to upward, in the process where the air intake flows into the combustion chamber, the tumble phenomenon of the air intake may be broken or weakened.

Consequently, according to the exemplary embodiment of the present invention, the valve flap 120 is configured for closing the lower passage 14 wherein the tumble phenomenon rotating upward to downward based on the air intake passage 10 or the combustion chamber is induced, whereby it is possible to perfectly induce the tumble phenomenon in the combustion chamber.

FIG. 1 shows that the upper passage 12 and the lower passage 14 are formed in the air intake passage 10 by the port plate 180, and the valve flap 120 is configured for controlling the air intake flow in the lower passage 14.

Meanwhile, as shown in FIG. 2, in the air intake control apparatus for a vehicle 100 according to another exemplary embodiment of the present invention, the port plate 180 is configured wherein the height changing portion 185 is disposed at a center based on the width direction of the port plate, and the height changing portion 185 forms different heights at left and right portions of the port plate from the lower internal wall of the air intake passage 10.

As described above, the present invention is configured wherein the port plate 180 is disposed with the height changing portion 185 to induce the swirl of the air intake flow, and the height changing portion 185 forms different heights at left and right portions of the port plate wherein by the height changing portion 185, an imbalance of the air flow between the left and right sides of the port plate 180 is induced.

The height relation between the left and right portions based on the height changing portion 185 may vary. For example, the left portion may be higher than the right, or the right portion may be higher than the left.

However, heights of the remaining portions except the height changing portion 185 remain constant considering the definition of the height changing portion 185, and heights of the left and the right portions are different from each other to induce the swirl.

In FIG. 2, it is shown that as one of various embodiments of the present invention, that the height changing portion 185 is disposed at the center of the port plate 180, whereby the heights of the left and right portions of the port plate 180 are different from each other, wherein in particular, the height of the left portion is higher than that of the right. In other words, the left portion has a height of H1 different from a height of H2 of the right portion.

Meanwhile, as shown in FIG. 2, in the air intake control apparatus for a vehicle 100 according to the exemplary embodiment of the present invention, the port plate 180 is configured wherein the height changing portion 185 is disposed at the center of the port plate 180 to form a step that changes the height of the port plate discontinuously.

To be more specific, in the exemplary embodiment of the present invention, the height changing portion 185 is disposed at a predetermined point of the center of the port plate 180 based on the width direction wherein the left and right portions based on the height changing portion 185 are distinguished.

Since the height changing portion 185 is disposed at the predetermined point, the portion formed with the height changing portion 185 is formed to be a step based on a cross-section of the port plate 180. Based on the stepped portion, the left portion and the right portion extend to have constant heights, and heights of the left and right portions are different from each other.

The above configuration is shown in FIG. 2. FIG. 2 illustrates an exemplary embodiment where of the port plate 180, the left portion is higher than the right based on the height changing portion 185.

Consequently, in the exemplary embodiment of the present invention, based on the height changing portion 185, the cross-sectional area of air flow of the left portion is different from that of the right portion, whereby swirl is induced in the air flowing into the combustion chamber.

The valve flap 120 is in a form of a step to correspond to the cross-sectional shape of the port plate 180. In other words, according to the present embodiment of the present invention, the valve flap 120 is configured wherein an end portion thereof is rotated to come into contact with the port plate 180 in the upstream of the port plate 180 wherein the lower passage 14 is closed. The valve flap 120 is in a form of a step to correspond to the cross-sectional shape of the port plate 180, whereby it is possible to block the air intake flow in the lower passage 14.

Meanwhile, as shown in FIG. 3, in the air intake control apparatus for a vehicle 100 according to another exemplary embodiment of the present invention, the port plate 180 is configured wherein the height changing portion 185 is disposed throughout the width direction of the port plate 180, wherein the height of the port plate changes throughout the width direction.

To be more specific, the port plate 180 may be configured wherein the height changing portion 185 is disposed throughout the width direction, whereby the height of the port plate changes along the width direction. Meanwhile, as described above, the height of the port plate 180 changes along the width direction, but is constant in a longitudinal direction, whereby the cross-sectional shape of the port plate is constant along a longitudinal direction.

As described above, the port plate 180 is configured wherein the height changing portion 185 is disposed throughout the width direction, whereby it is possible to enhance the induction of asymmetry of the air intake flow between left and right sides, and is possible to establish a more specific strategy for inducing the swirl.

In other words, intensity or a size of the swirl may be vary according to the shape of the port plate 180, wherein in further embodiments of the present invention, the height changing portion is disposed throughout the width direction of the port plate 180, whereby it is possible to raise a degree of freedom in inducing the swirl, and is possible to broaden ranges including the intensity of the swirl.

Referring to FIG. 3, the height changing portion 185 is disposed throughout the width direction, so the height of the port plate 180 continuously changes along the width direction. Accordingly, the left portion has a height of H1 different from a height of H2 of the right portion.

Meanwhile, as shown in FIG. 3, in the air intake control apparatus for a vehicle 100 according to a further exemplary embodiment of the present invention, the port plate 180 is configured wherein the height thereof continuously changes along the width direction.

To be more specific, according to a further exemplary embodiment of the present invention, the height of the port plate 180 continuously changes, so the cross-sectional shape of the port plate has no step. Accordingly, based on the upper passage 12, the cross-sectional area of air intake flow continuously changes along the width direction of the port plate 180.

Even in the case where the cross-sectional area of air flow is formed asymmetrically to induce the swirl of air, when the cross-sectional shape of the port plate 180 is determined to be formed in a step shape, irregular air flow at the height changing portion 185 may occur when the size of the step is increased to increase the intensity of the swirl.

For example, when the size of the step is increased, air intake creates turbulence at a step, whereby performance in the air intake flow may be degraded. However, as in a further exemplary embodiment of the present invention, in the case where the height changing portion 185 is formed throughout the width direction of the port plate 180 and the height continuously changes, it is possible to enhance asymmetry of the air intake flow between left and right portions without degrading performance in the flow.

FIG. 3 illustrates a view of the port plate 180, the height of which continuously changes along the width direction.

Meanwhile, as shown in FIG. 3, in the air intake control apparatus for a vehicle 100 according to a further exemplary embodiment of the present invention, the port plate 180 is configured wherein the height thereof from the lower internal wall of the air intake passage 10 changes continuously along the width direction.

To be more specific, the height of the port plate 180 changes continuously and continuously along the width direction, whereby the port plate may be formed to be an inclined shape where the left and right end portions have different heights.

As described above, by the port plate 180, the height of which changes continuously, air intake flows forward along the upper passage 12, and the flow is evenly concentrated on either left or right side, whereby it is possible to effectively induce swirl without degrading flow characteristic.

Meanwhile, according to the cross-sectional shape of the port plate 180, the cross-sectional shape of the valve flap 120 may be determined to correspond to the port plate 180, as in the above description.

Referring to FIG. 3, the port plate 180 has a constant inclination and the height thereof changes along the width direction according to a further exemplary embodiment of the present invention. In FIG. 3, an exemplary embodiment where the left end portion is higher than the right end portion is shown, whereby while air passes via the port plate 180, the flow is concentrated on the right portion, and when the air intake flows into the combustion chamber, the swirl rotating from the right to the left may be induced.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An intake air control apparatus for a vehicle, the apparatus comprising:
   a valve flap provided in an intake air passage, the valve flap having a rotation shaft facing opposite sides of the air intake passage, to control a cross-sectional area of air intake flow according to a rotation angle thereof about the rotation shaft;

a driving device supplying a driving force to the valve flap; and a port plate provided in the air intake passage, with a longitudinal direction of the port plate being in parallel to a longitudinal direction of the air intake passage, the port plate dividing the air intake passage into an upper passage and a lower passage, wherein based on a width direction of the port plate, at least a portion of the port plate has a height changing portion that changes a height of the port plate from a lower internal wall of the air intake passage wherein the height changing portion is provided at a center portion based on the width direction of the port plate, wherein the height includes a first height measured from the lower internal wall at a left side of the center portion of the port plate and a second height measured from the lower internal wall at a right side of the center portion of the port plate, the first height being different from the second height, and wherein air flowing through left and right sides of the air intake passage, based on the height changing portion, has different cross-sectional areas at the left and right sides of the port plate, leading to asymmetry of air flow between the left and right sides of the air intake passage.

2. The intake air control apparatus of claim 1, wherein the valve flap is configured for controlling the air intake flow flowing into the lower passage by being rotated.

3. The intake air control apparatus of claim 1, wherein the port plate is configured such that the height changing portion has different thicknesses at left and right portions of the height changing portion.

4. The intake air control apparatus of claim 3, wherein the port plate is configured such that the height changing portion is provided at the center portion of the port plate to form a step that changes the height of the port plate discontinuously.

5. The intake air control apparatus of claim 1, wherein the port plate is configured such that the height changing portion is provided throughout the width direction of the port plate, wherein the height of the port plate changes throughout the width direction.

6. The intake air control apparatus of claim 5, wherein the port plate is configured such that the height thereof continuously changes along the width direction.

7. The intake air control apparatus of claim 6, wherein the port plate is configured such that the height thereof from the lower internal wall of the air intake passage changes continuously along the width direction.

* * * * *